(12) United States Patent
Kurzweil

(10) Patent No.: US 7,084,874 B2
(45) Date of Patent: Aug. 1, 2006

(54) VIRTUAL REALITY PRESENTATION

(75) Inventor: Raymond C. Kurzweil, Newton, MA (US)

(73) Assignee: Kurzweil AINetworks, Inc., Wellesley Hills, MA (US)

(*) Notice: Subject to any disclaimer, the term of this patent is extended or adjusted under 35 U.S.C. 154(b) by 0 days.

(21) Appl. No.: 10/028,061

(22) Filed: Dec. 21, 2001

(65) Prior Publication Data

US 2002/0105521 A1 Aug. 8, 2002

Related U.S. Application Data

(60) Provisional application No. 60/258,293, filed on Dec. 26, 2000.

(51) Int. Cl.
*G06T 13/00* (2006.01)

(52) U.S. Cl. ............... 345/473; 345/419; 345/956; 345/957; 715/756; 715/757

(58) Field of Classification Search ............ 345/473, 345/957, 956, 757, 756, 706, 419
See application file for complete search history.

(56) References Cited

U.S. PATENT DOCUMENTS

| 5,495,576 A | * | 2/1996 | Ritchey | 345/420 |
| 5,923,337 A | * | 7/1999 | Yamamoto | 345/473 |
| 6,453,294 B1 | * | 9/2002 | Dutta et al. | 704/270.1 |
| 6,476,834 B1 | * | 11/2002 | Doval et al. | 345/863 |

* cited by examiner

*Primary Examiner*—Kimbinh T. Nguyen
(74) *Attorney, Agent, or Firm*—Fish & Richardson P.C.

(57) ABSTRACT

A real-time virtual presentation method is provided. The method includes capturing motion of a user, capturing audio of the user, transforming the audio of the user into audio of an opposite gender of the user and animating a character with the motion and transformed audio in real-time.

11 Claims, 6 Drawing Sheets

VIRTUAL REALITY PRESENTATION

CLAIM OF PRIORITY

This application claims priority under 35 USC §119(e) to U.S. patent application Ser. No. 60/258,293, filed on Dec. 26, 2000, the entire contents of which are hereby incorporated by reference.

TECHNICAL FIELD

This invention relates to virtual reality presentations.

BACKGROUND

Virtual reality is the simulation of a real or imagined environment that can be sensed. One particular type of virtual reality is that experience that can be visually sensed in three dimensions and may additionally provide an interactive experience. A sensory experience in virtual reality may include a visual experience with full real-time motion possibly accompanied by sound and tactile and other forms of sensory perception.

One form of virtual reality is a three-dimensional (3-D) image that can be explored interactively at a personal computer. With this form of virtual reality, one can control the experience by manipulating keys or a mouse so that the content of the image moves in some direction or zooms in or out. As the images become larger and interactive controls more complex, the perception of "reality" increases. More sophisticated efforts involve such approaches as wrap-around display screens and haptics joystick devices that let one feel the display images.

VRML (Virtual Reality Modeling Language) is a language for describing 3-D image sequences and possible user interactions to go with them. Using VRML, one can build a sequence of visual images into Web settings with which a user can interact by viewing, moving, rotating, and otherwise interacting with an apparently 3-D scene. For example, one can view a room and use controls to move about the room, as one would experience it if one were walking through it in real space.

SUMMARY

In an aspect, the invention features a virtual reality presentation method including capturing motion of a user, capturing audio of the user, transforming the audio of the user into a different entity, and animating a character with the motion and transformed audio in real-time.

Embodiments may include one or more of the following. The method may also include displaying the animated character on an output device.

Capturing motion may include attaching multiple motion tracking sensors to areas of the user to track the user's movements, and transmitting signals representing the movements from the sensors to a computer system. Capturing audio may include attaching a microphone to the user. The microphone may be a wireless microphone.

Transforming the audio may include altering pitch characteristics of the audio of the user.

Transforming the audio may include transforming the auto into the different entity that is of the opposite gender as the gender of the user.

Animating may include applying the motion to a three dimensional (3-D) model, and combining the transformed audio to the 3-D model.

In another aspect, the invention features a presentation method including generating a three-dimensional (3-D) model of a character, capturing motion of a user in real-time, capturing audio of the user in real-time, modifying a gender of the audio of the user, and animating the 3-D model with the motion and modified audio of the user in real-time.

Embodiments may include one or more of the following. The method may also include displaying the animated 3-D model on an output device.

Capturing motion may include attaching multiple motion tracking sensors to areas of the user to track the user's movements, and transmitting signals representing the movements from the sensors to a computer system.

Capturing audio may include attaching a microphone to the user and the microphone may be a wireless microphone.

Modifying may include altering pitch characteristics of the audio of the user.

In another aspect, the invention features a presentation system including a motion tracking device connected to a user, an audio receiving device connected to the user, an audio receiver/converter for receiving and converting the audio into a different gender than that of the user, and a system to produce an animated three-dimensional character from the motion and converted audio.

In another aspect, the invention features a presentation method including detecting motion of a user, detecting audio of the user, altering the audio of the user, synchronizing the motion of the user to an animated character, and synchronizing the altered audio of the user to the animated character.

Embodiments may include one or more of the following.

Detecting motion may include receiving signals representing motions from sensors attached to the user and processing the signals in a computer system.

Detecting audio may include receiving audio signals from a microphone attached to the user.

Altering the audio may include a fundamental frequency of the audio.

The method may also include displaying the animated character on an output device. The output device may be a projector, a flat panel plasma monitor, a multi-scan presentation monitor, an electronic whiteboard or a projection screen.

Embodiments may include one or more of the following. The system may also include an output device.

The motion tracking device may include a set of inter-connected sensors affixed to the user, and a transmitting device for receiving signals from the sensors and sending them to a computer system.

The audio receiving device may be a microphone and the microphone may be a wireless microphone.

The audio receiver/converter may include an audio effects digital signal processor.

Embodiments of the invention may have one or more of the following advantages.

Real-time voice and motion are combined and displayed as an animated character. A gender of the user is transformed on the display to the opposite gender with appropriate voice alterations.

Real-time voice is altered and mixed to match a desired output of the user.

The motion of, for example, a performer, is picked up by the sensors attached to the performer and communicated to a computer. The character being generated through the performance animation is animated by the computer and caused in real time to have the same movement as the performer (and as picked up by the sensors). The animated character, which may be a different gender, moves just like the performer. Meanwhile, the voice of the performer is changed, for example, to a different gender through modification of a fundamental frequency.

A mouth of the animated character is caused to move in synchrony with the speaking of the performer.

Other features, objects, and advantages of the invention will be apparent from the description and drawings, and from the claims.

DETAILED DESCRIPTION

Figure 1:
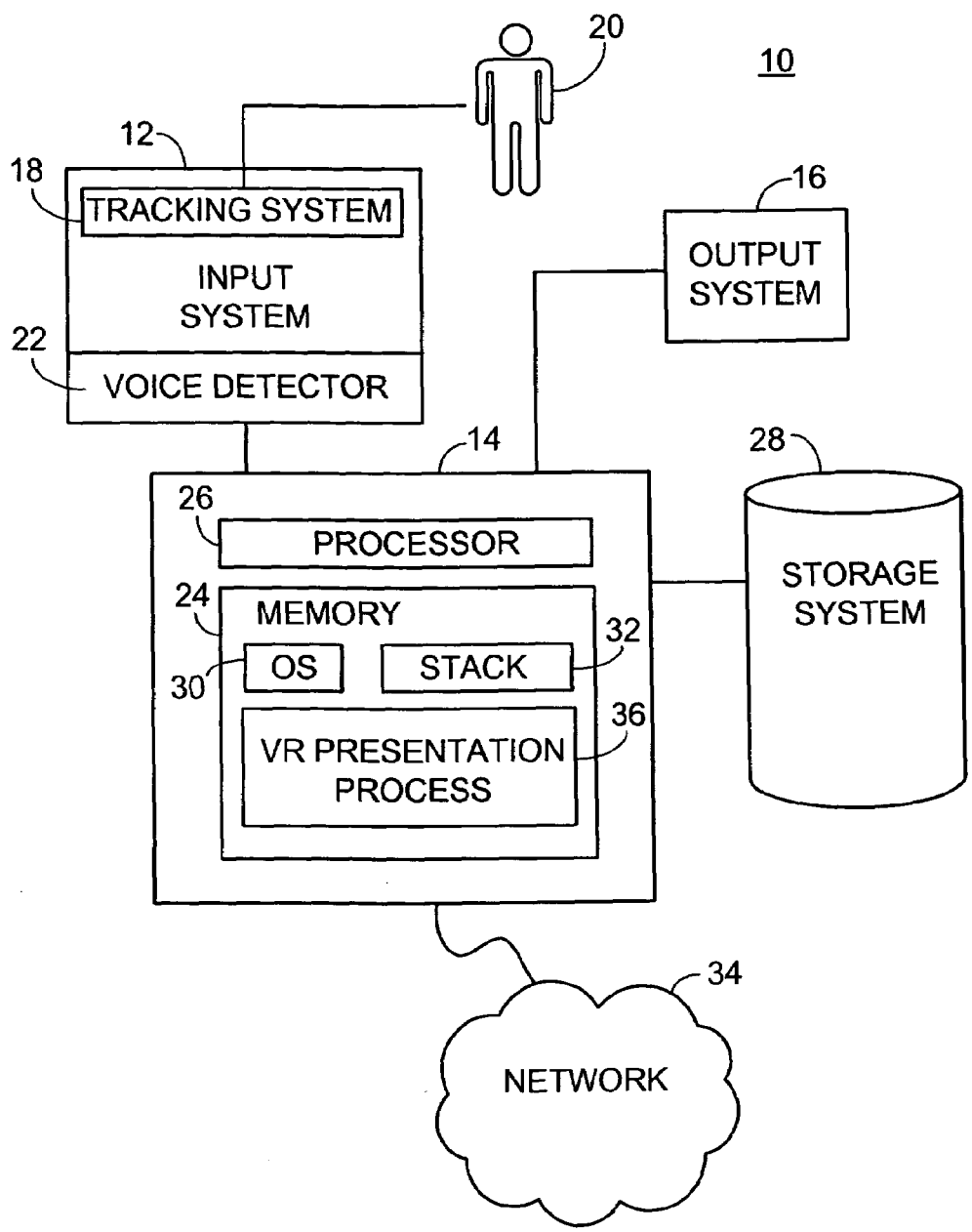
FIG. 1 is a block diagram of a virtual reality presentation system.

Referring to FIG. 1, a virtual reality presentation system 10 includes an input system 12, a computer system 14, and an output system 16. In an example, the input system 12 includes a motion tracking system 18 that is attached to a user 20 that tracks movements of the user 20. The input system 12 also includes an audio voice detector 22 to pick up voice from the user 20.

The computer system 14 includes a memory 24, a processor 26 and a storage system 28. Memory 24 stores an operating system ("OS") 30, a TCP/IP protocol stack 32 for communicating over a network 34 and machine-executable instructions executed by processor 26 to perform a virtual reality (VR) presentation process 36.

The output system 16 may include any suitable presentation display equipment, such as a projector, flat panel plasma monitor, multi-scan presentation monitor, electronic white board or projection screen.

Figure 2:
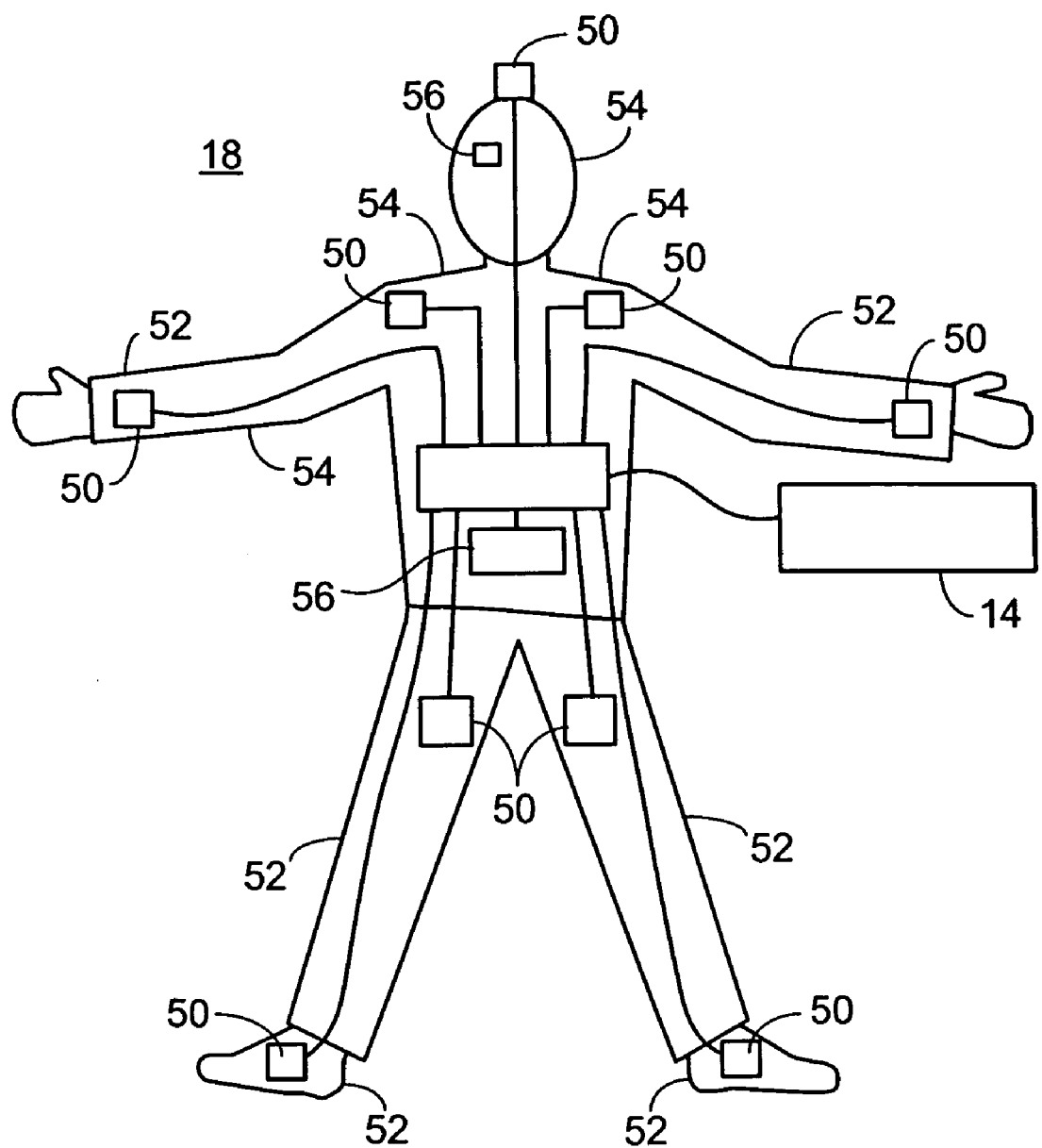
FIG. 2 is a block diagram of a motion tracking system.

Referring to FIG. 2, the motion tracking system 18 is shown. The motion tracking system 18 may be any commercially available motion tracking system, such as the Wireless MotionStar™ System from Ascension Technology of Burlington, Vt. The motion tracking system 18 includes multiple sensors 50 being placed on the user 20, each of the sensors 50 located on different limbs 52 or other areas 54 of the user's body. A transmitter 56 transmits signals that are received by the sensors 50 and processed by the computer system 14. Computer system 14 may be directly linked to the motion tracking system 18, or connected via a wireless link (not shown).

The audio detector 22 includes a microphone 56 attached near the face of the user 20. In an example, microphone 56 is a wireless head worn microphone, such as the Shure Model WCM16 (from Shure, Inc. of Evanston, Ill.) headworn electret condenser microphone designed for wireless use by performers, lecturers, and others who need high quality voice pickup with maximum mobility. The microphone 56 has a wide frequency response, low RF susceptibility and reliable operation at temperature and humidity extremes to make is suitable for any vocal application.

Figure 3:
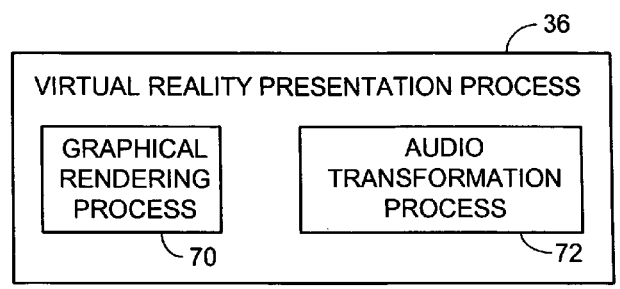
FIG. 3 is a block diagram of a virtual reality presentation process.

Referring to FIG. 3, the VR presentation process 36 includes a graphical rendering process 70 and an audio transformation process 72. The graphical rendering process 70 generates animated models for real-time animation. The audio transformation process 72 generates naturally sounding vocal harmonies in real-time.

Figure 4:
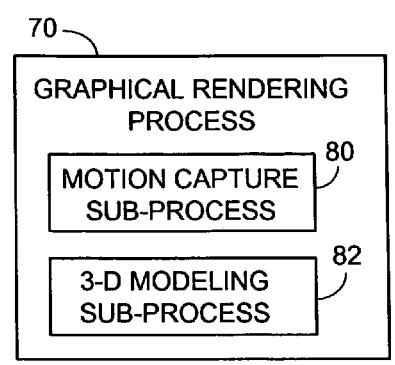
FIG. 4 is a block diagram of a graphical rendering process.

Referring to FIG. 4, the graphical rendering process 70 includes a motion capture subprocess 80 and a three-dimensional (3-D) modeling subprocess 82. The motion capture subprocess 80 receives real-time data from the motion tracking system 18 attached to the user 20. The 3-D modeling subprocess 82 generates a 3-D model whose movements are capable of being driven by user motion data received by the motion capture subprocess 80. The 3-D model is a computer-generated character (animated model) for real-time animation. Any computer-generated character may be used, such as those generated by Kleiser-Walczak of North Adams, Mass. The graphical rendering process 70 combines in real-time the 3-D character generated by the 3-D modeling process 82 with motions captured in the motion capture subprocess 80 to generate an animated character for display on the output system 16.

Figure 5:
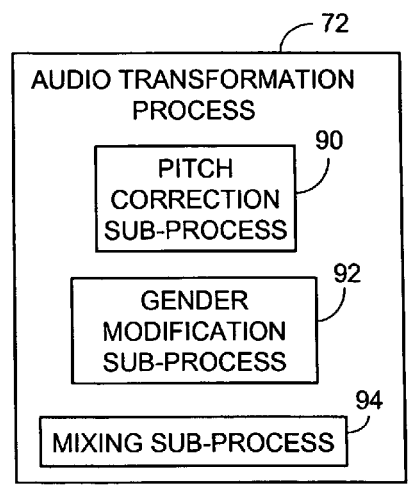
FIG. 5 is a block diagram of an audio transformation process.

Referring to FIG. 5, the audio transformation process of the virtual reality presentation process 36 includes a pitch correction subprocess 90, a gender modification subprocess 92 and a mixing subprocess 94. The pitch correction subprocess 90 receives voice data from the microphone 56 and changes the pitch of the input audio signal to a higher or lower level as desired. More specifically, the pitch correction subprocess 90 takes an input signal and increases the input signal in frequency by an amount determined by the user 20, typically over a continuously variable range between 0.25 and 4.0 corresponding to shifts of −2 to 2 octaves.

The gender modification subprocess 92 receives the pitch corrected voice data from the pitch correction subprocess 90. The gender modification subprocess 92 produces natural sounding vocal harmonies in real-time in a gender-modified voice. In one example, the gender modification subprocess 92 converts male voice data into female voice data. In another example, the gender modification subprocess 92 converts female voice data into male voice data. The gender modification subprocess 92 utilizes audio effects digital signal processing, such as found in Orville™ from Eventide, Inc. of Little Ferry, N.J.

The mixing subprocess 94 receives data generated in the gender modification subprocess 92. The mixing subprocess 94 generates a linear sum of multiple input signals and combines voice and music sources. Any suitable audio mixing algorithm may be employed, such as from Yamaha Corporation of MI.

Referring again to FIG. 1, the VR presentation process 36 combines audio and visual data and generates an image on output device 16 in real-time. The audio and motions of the user 20 control the displayed image's audio and motions.

Figure 6:
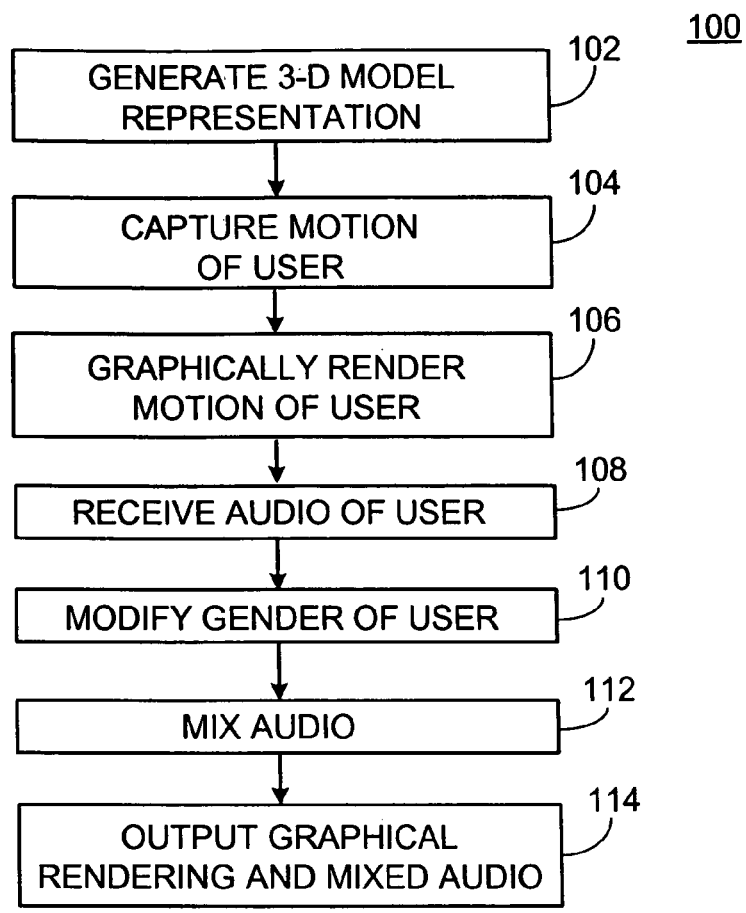
FIG. 6 is a flow diagram of a virtual reality process.

Referring to FIG. 6, a virtual reality (VR) process 100 includes generating (102) a three-dimensional (3-D) model representation of a character. The character is capable of being animated on a display. The VR process 100 captures (104) motions of a user having receivers affixed to them graphically and renders (106) the motions to the character.

The VR process 100 receives (108) audio signals from a microphone or other audio pickup device affixed to the user and modifies (110) a gender of the user. The VR process 100 (112) mixes (112) voice and other audio and outputs (114) an animated character representative of the motions and audio of the user in real-time on the output system 16.

Other embodiments are within the scope of the following claims.

What is claimed is:

1. A virtual reality presentation method comprising:
capturing motion of a user, the user having a gender;
capturing audio of the users the user being in a presentation environment comprising music in addition to the user's speech;
capturing the presentation environment comprising music in addition to the user's speech;
transforming the audio of the user to a gender different from the gender of the user;
animating a character with the motion and transformed audio in real-time; rendering the character animated with the captured motion of the user on an output display device;
mixing the transformed audio of the user with the captured presentation environment, including the music by generating a linear sum of combined voice and environment including the music; and
rendering the transformed audio of the user in the environment including music with the audio being of the different gender of the user through speakers.

2. The method of claim 1 in which capturing motion comprises:
attaching multiple motion tracking sensors to areas of the user to track the user's movements; and
transmitting signals representing the movements from the sensors to a computer system.

3. The method of claim 1 in which capturing audio comprises attaching a microphone to the user.

4. The method of claim 3 in which the microphone is a wireless microphone.

5. The method of claim 1 in which transforming the audio comprises:
altering pitch characteristics of the audio of the user.

6. The method of claim 1 in which animating comprises:
applying the motion to a three dimensional (3-D) model; and
combining the transformed audio to the 3-D model.

7. A virtual reality presentation method comprising:
generating a three-dimensional (3-D) model of a character;
capturing motion of a user in real-time;
capturing audio of the user in real-time;
capturing the presentation environment comprising music in addition to the user's audio;
modifying the audio of the user to render the audio in a gender that is different from the gender of the user;
animating in real-time the 3-D model with the motion of the user; and
rendering the 3-D character animated with the captured motion of the user; and
rendering the modified audio of the user in the environment including music through speakers with the transformed audio of the user on an output display device.

8. The method of claim 7 in which capturing motion comprises:
attaching multiple motion tracking sensors to areas of the user to track the user's movements; and
transmitting signals representing the movements, from the sensors to a computer system.

9. The method of claim 7 in which capturing audio comprises attaching a microphone to the user.

10. The method of claim 9 in which the microphone is a wireless microphone.

11. The method of claim 7 in which modifying comprises altering pitch characteristics of the audio of the user.

* * * * *